United States Patent
Choi

(10) Patent No.: US 7,613,152 B2
(45) Date of Patent: Nov. 3, 2009

(54) DUAL BAND DUAL MODE TERMINAL SUPPORTING DIFFERENT PACKET FRAME MODES AND SUPPORTING METHOD THEREOF

(75) Inventor: Hyun-Kyung Choi, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 928 days.

(21) Appl. No.: 10/828,345

(22) Filed: Apr. 21, 2004

(65) Prior Publication Data

US 2004/0213262 A1 Oct. 28, 2004

(30) Foreign Application Priority Data

Apr. 22, 2003 (KR) .................. 10-2003-0025462

(51) Int. Cl.
*H04B 7/216* (2006.01)
(52) U.S. Cl. .................. 370/335; 370/340; 370/342; 370/463; 370/466
(58) Field of Classification Search .................. 370/328, 370/329, 335
See application file for complete search history.

(56) References Cited

U.S. PATENT DOCUMENTS

| | | | | |
|---|---|---|---|---|
| 5,666,362 A | * | 9/1997 | Chen et al. .................. | 370/420 |
| 5,802,278 A | * | 9/1998 | Isfeld et al. .................. | 709/249 |
| 6,239,747 B1 | * | 5/2001 | Kaminski .................. | 342/442 |
| 2001/0010689 A1 | * | 8/2001 | Awater et al. .................. | 370/344 |
| 2002/0085540 A1 | * | 7/2002 | Hyvarinen et al. .......... | 370/352 |
| 2003/0081666 A1 | * | 5/2003 | Nah .......................... | 375/222 |
| 2003/0129971 A1 | * | 7/2003 | Gopikanth .................. | 455/414 |
| 2003/0193923 A1 | * | 10/2003 | Abdelgany et al. .......... | 370/342 |
| 2003/0211862 A1 | * | 11/2003 | Hutchison et al. ......... | 455/552.1 |
| 2004/0185899 A1 | * | 9/2004 | Hayem et al. ............. | 455/552.1 |
| 2004/0203647 A1 | * | 10/2004 | Shi et al. .................. | 455/414.1 |
| 2004/0208150 A1 | * | 10/2004 | Chang et al. ................ | 370/338 |
| 2004/0213262 A1 | * | 10/2004 | Choi ....................... | 370/395.5 |

FOREIGN PATENT DOCUMENTS

| | | |
|---|---|---|
| CN | 1358038 A | 7/2002 |
| EP | 1 213 941 A2 | 6/2002 |
| KR | 1020000042820 | 7/2000 |
| KR | 1020000044254 | 7/2000 |
| KR | 1020020045072 | 6/2002 |
| KR | 2003084005 A * | 11/2003 |
| KR | 10-2004-15885 | 2/2004 |

* cited by examiner

*Primary Examiner*—Kwang B Yao
*Assistant Examiner*—Jeffrey M Rutkowski
(74) *Attorney, Agent, or Firm*—KED & Associates, LLP

(57) ABSTRACT

A DBDM (dual band dual mode) terminal is provided for supporting different packet frame modes and a supporting method thereof. This may be provided by mounting a data communication protocol (TCP/UDP/IP/PPP) supporting different communication networks onto a video chip having application of packet data services of the DBDM terminal. It therefore may be possible to remove communication protocols of modem chips for different communication networks applied to a DBDM terminal. Accordingly, consistency of communication protocol may be maintained by using the same communication protocol in different communication networks, and performance of a terminal may also be improved by making application of a packet data service interwork directly with a socket. In addition, by mounting a communication protocol on a video chip, debugging can be easily performed during development.

21 Claims, 4 Drawing Sheets

DUAL BAND DUAL MODE TERMINAL SUPPORTING DIFFERENT PACKET FRAME MODES AND SUPPORTING METHOD THEREOF

The present application claims priority from Korean Patent Application No. 25462/2000, filed Apr. 22, 2003, the subject matter of which is incorporated herein by reference.

BACKGROUND OF THE INVENTION

1. Field of the Invention

The present invention relates to a mobile communication terminal, and in particular to a DBDM (dual band dual mode) terminal supporting different packet frame modes.

2. Background of the Related Art

Due to the expanding usage range of mobile stations and increasing demand for high speed data communication, there has been a limit for supporting various data communication services with present CDMA (code division multiple access) networks as second generation wireless communication networks.

Accordingly, WCDMA (wideband code division multiple access) networks have been introduced as a third generation communication network for supporting various data communication services and high speed data communication. However, because the third generation communication network has been presently installed by way of example, a DBDM (dual band dual mode) terminal has been developed that uses the third generation communication network in an area in which a pertinent third generation communication network is installed and uses the existing second generation communication network in the third generation communication network-installed area.

The DBDM terminal may include a CDMA modem chip, a WCDMA modem chip and a video chip. More specifically, the terminal may include a total of three processors and an interface among the processors.

The video chip performs a function of a master control program for controlling a UI (user interface) (not shown) of a mobile station and includes applications of packet data services such as a VOD (video on demand), a WAP (wireless application protocol) and a MMS (multimedia message service).

In the CDMA modem chip, communication protocols (TCP/UDP/IP/PPP) for processing a CDMA protocol stack and packet data are provided. In addition, in order to interwork with application of a packet data service of the video chip, a socket API (application program interface) is mounted onto a TCP/UDP superior layer.

In CDMA networks, data communication is performed between a terminal and a base station by using PPP (point to point protocol) frames. Accordingly, in the case of performing communication by using PPP frames in the CDMA network, the DBDM terminal performs data communication by using the CDMA modem chip.

When the DBDM terminal receives data from the CDMA network, the CDMA modem chip processes PPP frames received from the CDMA network into IP packets according to the built-in communication protocols (TCP/UDP/IP/PPP) and transmits the IP packets to the video chip. In addition, when the terminal transmits data in the CDMA network, the CDMA modem chip converts the IP packets received from the video chip into PPP frames according to the built-in communication protocols (TCP/UDP/IP/PPP) and transmits them through the CDMA network.

In the WCDMA modem chip, communication protocols TCP/UDP/IP/PPP) for processing the WCDMA protocol stack and packet data are provided. In addition, similar to the CDMA modem chip, in order to interwork with applications of the packet data service of the video chip, a socket API (application program interface) is mounted onto a TCP/UDP superior layer.

In the case of performing data communication in the WCDMA network, both PPP and IP (internet protocol) frames are supported between a terminal and a base station. In the WCDMA network, because it is appropriate to communicate with IP frames in performance and expense aspects, communication is generally performed by using IP frames, as occasion demands, and IP frames and PPP frames are mutually converted and used.

In the above-mentioned DBDM terminal, because data communication protocols exist in a modem chip supporting each network and different protocols are used according to the WCDMA and CDMA networks, when a packet data service is implemented, an additional interface for interworking a socket with a modem chip according to each network is required. In addition, because it is difficult to interwork applications of all packet data services directly with a socket, performance of a terminal may be lowered, and all communication protocols of the WCDMA modem chip and the CDMA modem chip have to be debugged when the terminal has a problem.

SUMMARY OF THE INVENTION

An object of the invention is to solve at least the above problems and/or disadvantages and to provide at least the advantages described hereinafter.

In order to solve the above-mentioned problems, an object of the present invention may be to provide a DBDM (dual band dual mode) terminal supporting different packet frame modes and a supporting method thereof capable of maintaining protocol use consistency in different communication networks.

Another object of the present invention may be to improve performance of a terminal by directly interworking with a socket and facilitated debugging of a data communication protocol by mounting a data communication protocol (TCP/UDP/IP/PPP) supporting both CDMA (code division multiple access) and WCDMA (wideband code division multiple access) on a video chip of a DBDM terminal in order to make a CDMA modem chip and a WCDMA modem chip perform only a modem function.

In order to achieve the above-mentioned objects, a dual mode terminal supporting different packet frame modes may include a video chip having an application of packet data services and second and third generation data communication protocol; a second generation network modem chip which is connected with the video chip through an interface and has a protocol stack about a second generation communication network; and a third generation network modem chip which is connected with the video chip through an interface and has a protocol stack about a third generation communication network.

In a DBDM (dual band dual mode) terminal, a method for supporting different packet frame modes may include judging a present system mode by using a terminal including a video chip having a second generation and third generation data communication protocol; transmitting packet data to a pertinent network according to a system mode; and receiving packet data from the pertinent network.

The packet data transmitting step may include transmitting a pertinent IP frame to the third generation network by transmitting the IP frame passing IP packet processing directly to a third generation modem chip according to a system mode.

The packet data transmitting step may include transmitting an IP frame passing IP packet processing to a PPP protocol, converting it into a PPP frame, transmitting the PPP frame to a second generation network modem chip and transmitting the pertinent PPP frame to the second generation network according to a system mode.

The packet data receiving step may include transmitting an IP frame received from the third generation network to a video chip when packet data is received from the third generation communication network, transmitting the received IP frame from the video chip to an IP protocol in order to perform packet processing and operating application of the pertinent packet data service.

The packet data receiving step may include transmitting a PPP frame received from the second generation network to a video chip when packet data is received from the second generation communication network, converting the PPP frame into an IP frame and performing packet processing in the video chip and operating application of the pertinent packet data service.

Additional advantages, objects, features and embodiments of the invention may be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Figure 1:
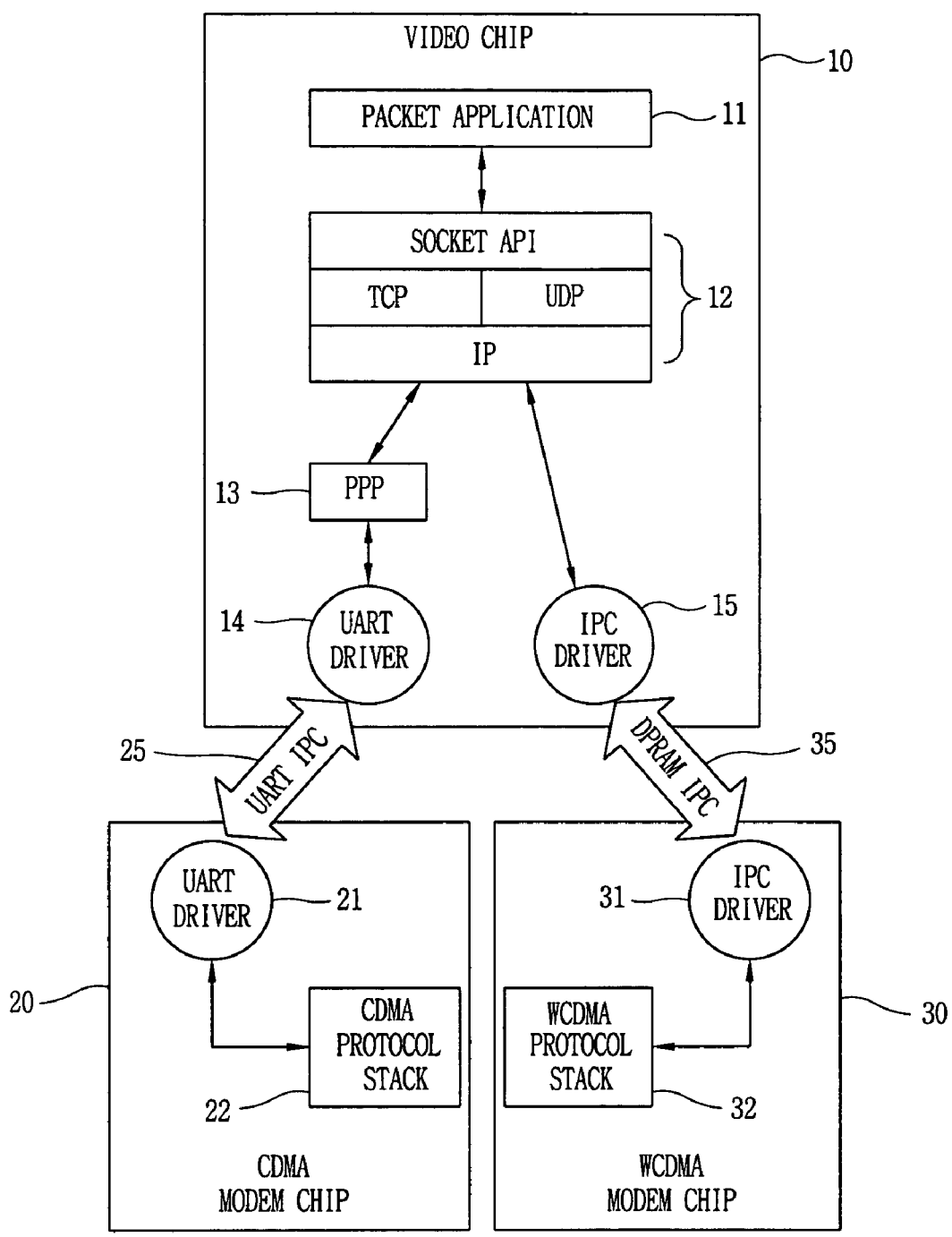
FIG. 1 is a block diagram illustrating packet data communication of a DBDM (dual band dual mode) terminal in accordance with an embodiment of the present invention.

FIG. 1 is a block diagram illustrating packet data communication of a DBDM (dual band dual mode) terminal in accordance with an embodiment of the present invention. As depicted in FIG. 1, the DBDM terminal supporting different packet frame modes includes a video chip 10 having application of packet data services and a protocol for second and third generation network data communication; a second generation network modem chip 20 communicating with the video chip 10 through a UART (universal asynchronous receiver transmitter) IPC (interprocessor communication) interface 25 and having a protocol stack 22 about a second generation communication network in order to perform a modem function only for the pertinent network; and a third generation network modem chip 30 communicating with the video chip 10 through a DPRAM (dual port RAM) IPC (interprocessor communication) interface 35 and having a protocol stack 32 about a third generation communication network in order to perform a modem function only for the pertinent network.

The video chip 10 and the CDMA modem chip 20 send/receive PPP frames used for packet data communication in the second generation communication network through the UART IPC interface 25, and the video chip 10 and the WCDMA modem chip 30 send/receive IP frames used for packet data communication in the third generation communication network through the DPRAM IPC interface 35.

The video chip 10 performs a master control program function for controlling a UI (user interface) (not shown) of a mobile station, and includes applications of packet data services such as a VOD (video on demand), a WAP (wireless application protocol) and a MMS (multimedia message service) and also includes data communication protocols (TCP/UDP/IP/PPP) 12, 13 usable in CDMA and WCDMA.

Different communication protocols have been mounted on modem chips according to specific communication networks. However, only one data communication protocol is mounted on the video chip 10. Each modem chip 20, 30 uses the data communication protocol (TCP/UDP/IP/PPP) by communicating with the video chip 10 through the interface 25, 35 respectively, and a packet processed through the data communication protocol (TCP/UDP/IP/PPP) 12, 13 of the video chip 10 can be interworked with the socket of the TCP/IP superior layer and provided to the packet application 11. Accordingly, an additional socket interworking interface may not be required for the CDMA modem chip 20 and the WCDMA modem chip 30.

Additionally internal communication may be performed with IP frames having a high speed, using the CDMA network in which communication is performed by using PPP frames, the video chip 10 including a PPP protocol 13. When IP frames are transmitted in the CDMA network, the IP frames can be transmitted to the CDMA modem chip 20 by being converted into PPP frames through the PPP protocol 13, and the PPP frame received from the CDMA modem chip 20 can be converted again into the IP frames.

Accordingly, the DBDM terminal in accordance with the present invention performs communication internally by using IP frames which have advantages in expense and processing speed aspects. In the case of PPP frame communication having relatively low speed, communication is performed by converting IP frames through the PPP protocol 13 and a serial communication port of the CDMA modem chip 20. For the PPP frame communication, the video chip 10 and the CDMA modem chip 20 respectively include a UART driver 14, 21 for serial communication, and the UART drivers 14, 21 are connected through a UART IPC (inter processor communication) 25. Although a serial communication method is used, the PPP packet data service is not interrupted because the PPP packet data service has a relatively low speed.

The video chip 10 can process communication with the WCDMA network smoothly. The video chip 10 internally processes IP packets as IP frames, and provides a pertinent IP frame to the WCDMA modem chip 30 at a high rate of speed through the existing DPRAM interface 35. The video chip 10 also provides an IP frame received through the WCDMA modem chip 30 to the IP protocol 12 directly. In that case, the video chip 10 and the WCDMA modem chip 30 require IPC drivers 15 and 31 respectively, to sustain communication.

Furthermore, the CDMA modem chip 20 and the WCDMA modem chip 30 perform only functions of a modem having a protocol stack 22, 32 about each network respectively. The CDMA modem chip 20 and the WCDMA modem chip 30 co-own the IP/PPP protocol mounted on the video chip 10.

Accordingly, as described-above, direct socket interworking with the applications of the packet data services is possible so as to improve performance. By debugging only the protocols 12, 13 of the video chip 10 in development, debugging efficiency may be improved. In addition, by using the same protocol, consistency of data communication protocol is maintained.

Actual packet data call processing in accordance with an embodiment of the present invention will be described.

Figure 2:
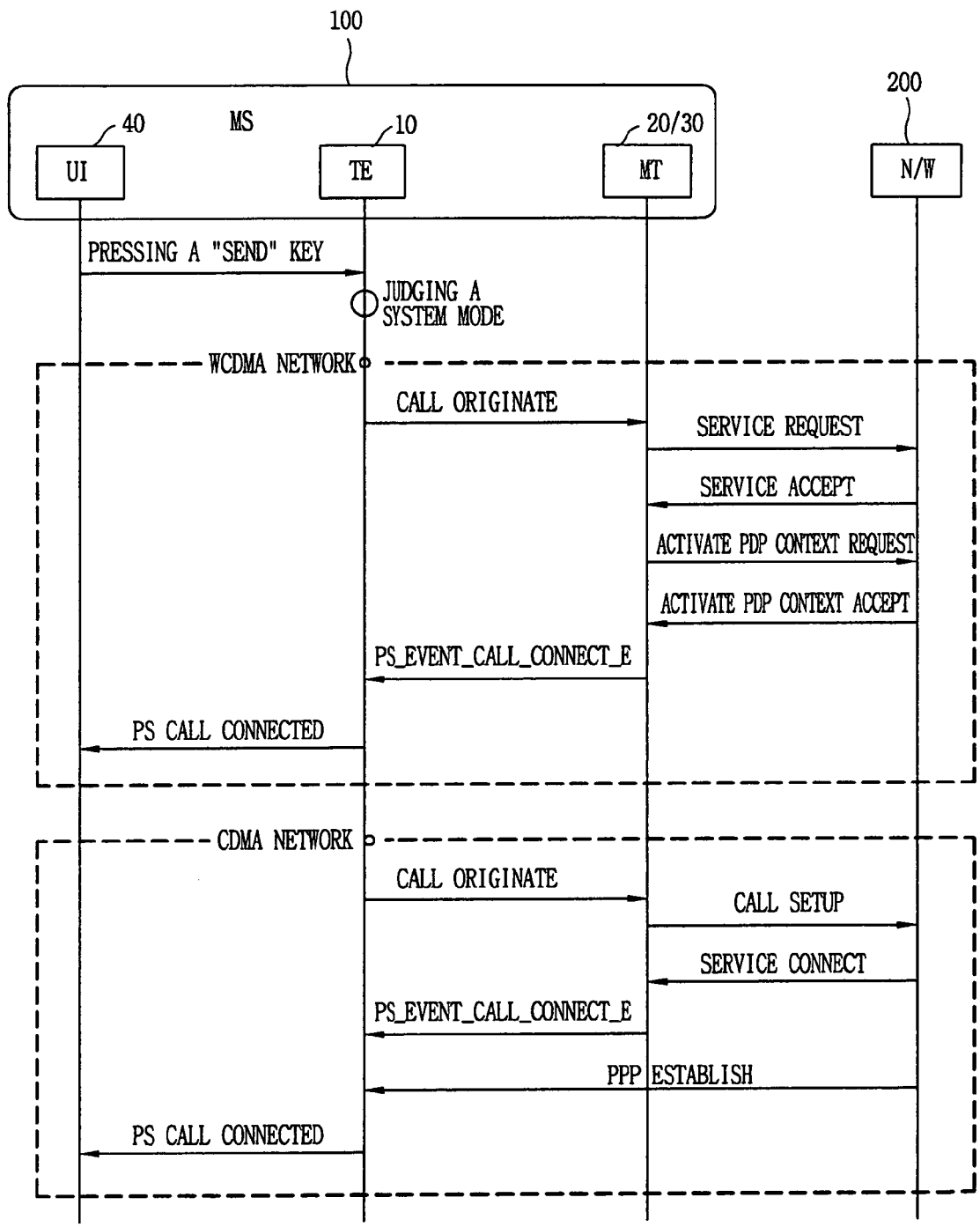
FIG. 2 illustrates a packet data call set-up procedure of the DBDM (dual band dual mode) terminal in accordance with an embodiment of the present invention.

FIG. 2 illustrates a packet data call set-up procedure of the DBDM (dual band dual mode) terminal in accordance with an embodiment of the present invention. More specifically, a UI (user interface) 40 provides a user's key input and various displays, and a TE (terminal equipment) as the video chip 10 performs packet data service application and control of the UI and has a dual mode protocol. A MT (mobile terminal) may be a CDMA modem chip 20 or a WCDMA modem chip 30 for performing a modem function about each network. There components are included in an MS (mobile station) 100. The MS 100 performs packet data communication with the CDMA/WCDMA network 200.

In order to perform packet data call connection, when a user presses a "send" key by operating the UI 40, the video chip 10 checks a present system mode and performs call connection according to the check result. In the case of a service using the WCDMA communication network, call connection to the WCDMA network is performed. Similarly, in the case of a service using the CDMA communication network, call connection to the CDMA network is performed.

First, in the case of IP packet data communication using the WCDMA network, the video chip 10 having a pertinent protocol notifies the WCDMA modem 30 of a call originate with an IP frame. The WCDMA modem 30 transmits a service request signal to the WCDMA network. When the service request is accepted by the WCDMA network, in order to activate a PDP (packet data protocol) context, the WCDMA modem 30 transmits an activate PDP context request signal to the network 200. The WCDMA modem 30 receives an activate PDP context accept signal as a reply to the request signal.

The terminal requests the network to perform the process for activating a PDP context between the terminal and the network, and that process is allocating an IP address and setting resources between the terminal and the network.

When the PDP context is activated, a PS_EVENT_CALL_CONNECT_E signal is transmitted to the video chip 10 in order to notify the video chip 10 of the call setup. The video chip 10 finishes the call setup by transmitting a PS CALL CONNECTED signal to the user interface 40.

In the case of PPP packet data communication using the CDMA network, the video chip 10 having the pertinent protocol notifies the CDMA modem 20 of the call originate with a PPP frame converted from an IP frame. The CDMA modem 20 transmits a call setup request to the CDMA network 200. After receiving a service connect signal from the network 200, the CDMA modem 20 transmits a PS_EVENT_CALL_CONNECT_E signal to the video chip 10, and accordingly, a PPP (point-to-point protocol) is set between the video chip 10 and the network 200. The video chip 10 finishes the call setup by transmitting a PS CALL CONNECTED signal to the user interface 40.

Figure 3:
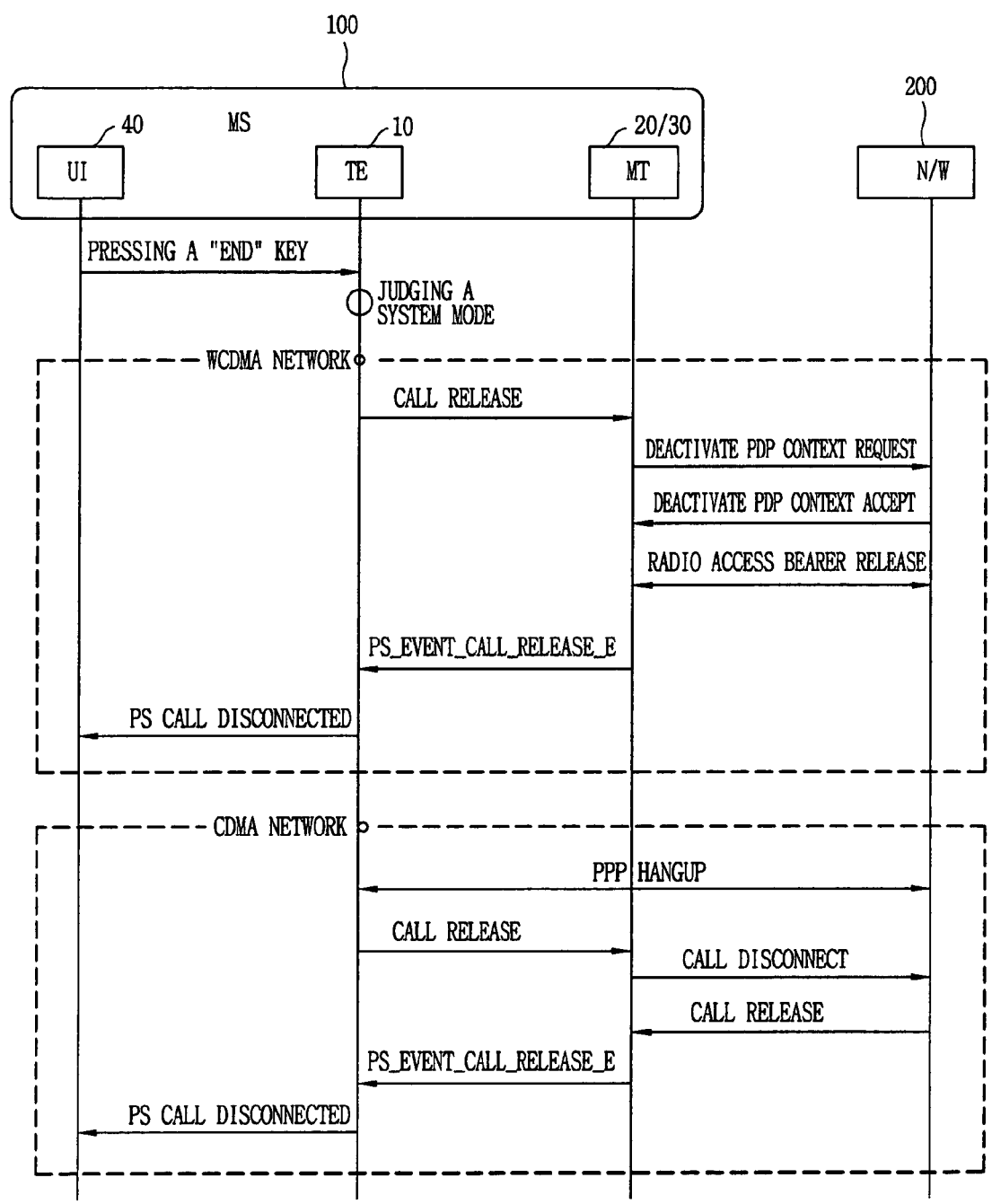
FIG. 3 illustrates a packet data call disconnection procedure of the DBDM (dual band dual mode) terminal in accordance with an embodiment of the present invention.

FIG. 3 illustrates a packet data call disconnection procedure of the DBDM (dual band dual mode) terminal in accordance with an embodiment of the present invention.

First, when a user presses an "end" key, the video chip 10 checks and performs a packet data call release procedure about a pertinent network.

In case of the WCDMA network, the video chip 10 notifies the WCDMA modem 30 of call release according to control about the user interface 40. The WCDMA modem 30 transmits a deactivate PDP context request signal to the network 200, and the WCDMA modem 30 receives the deactivate PDP context accept signal from the network 200. A radio access bearer between the terminal 100 and the network 200 is released. The WCDMA modem 30 notifies the video chip 10 of call release by transmitting a PS_EVENT_CALL_RELEASE_E signal to the video chip 10, and the video chip 10 transmits a PS CALL DISCONNECTED signal to the user interface 40 and finishes the call release.

In the case of the PPP packet data communication using the CDMA network, when PPP hang up is performed between the video chip 10 and the network 200, the video chip 10 having the pertinent protocol notifies the CDMA modem 20 of call release with a PPP frame converted from an IP frame, and the CDMA modem chip 20 requests a call disconnect to the network 200. The CDMA modem chip 20 receives the call release signal from the network 200 and notifies the video chip 10 of the call release by transmitting a PS_EVENT_CALL_RELEASE_E signal to the video chip 10. The video chip 10 transmits a PS CALL DISCONNECTED signal to the user interface 40 and finishes the call release.

A data transmitting/receiving process of the DBDM terminal in the WCDMA network and the CDMA network will be described with reference to FIG. 4.

Figure 4:
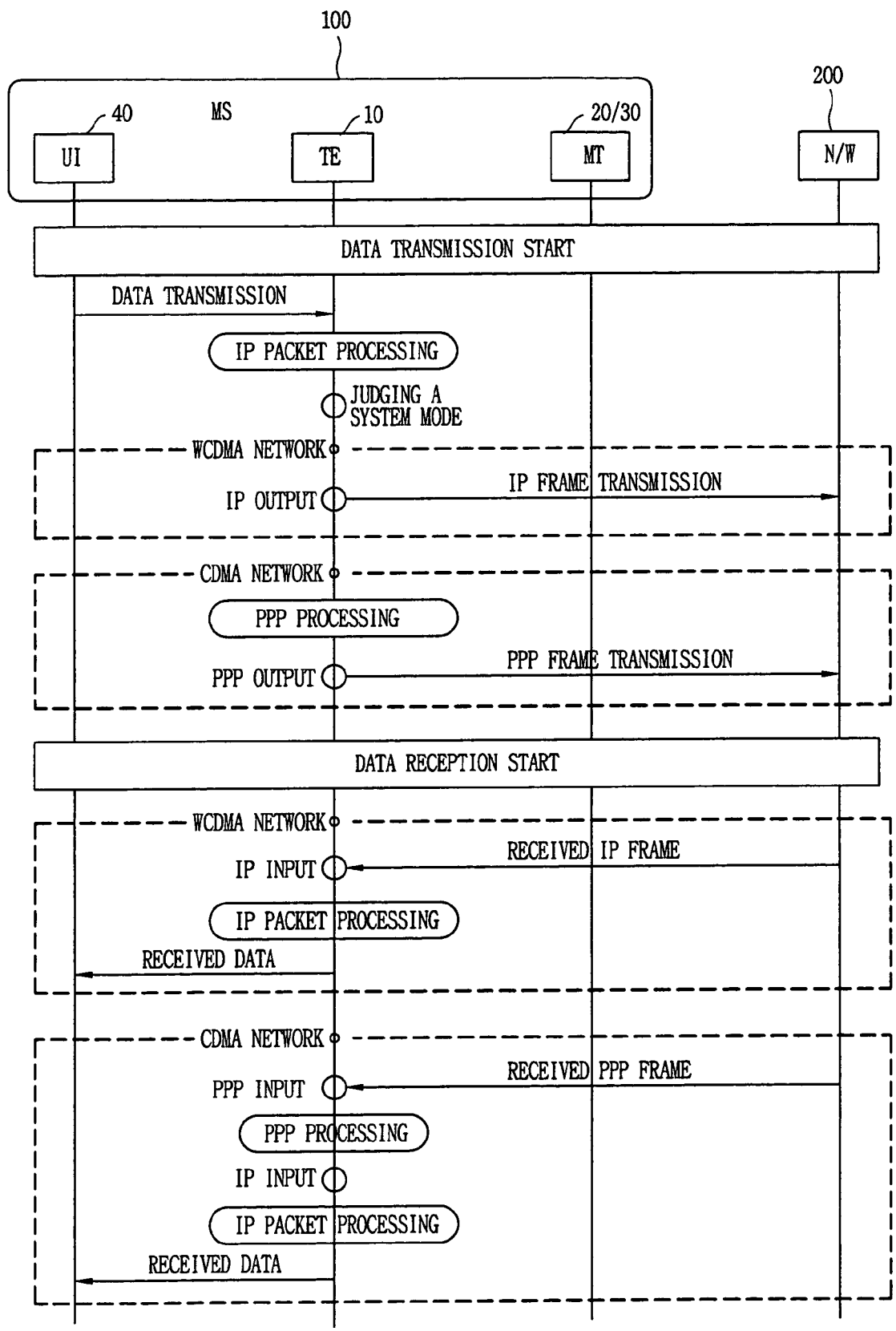
FIG. 4 illustrates a packet data send/receive procedure of the DBDM (dual band dual mode) terminal in accordance with an embodiment of the present invention.

FIG. 4 illustrates a packet data send/receive procedure of the DBDM (dual band dual mode) terminal in accordance with an embodiment of the present invention depicting an IP/PPP packet processing process of the video chip 10.

First, when the DBDM terminal transmits data, the data is transmitted from the UI 40 to the video chip 10. In transmitting packet data to the network 200, the terminal processes the transmitted data as an IP frame by adding an IP header through an IP packet processing. In performing packet data transmission from the terminal to the network, the IP packet processing is performed unconditionally.

The video chip 10 judges a present system mode. When the present system mode is in WCDMA communication, a packet-processed IP frame is transmitted to the WCDMA modem chip 30 through an IPC driver, and the WCDMA modem chip 30 transmits the received IP frame to the WCDMA network 200.

When the present system mode is in CDMA communication, the video chip 10 transmits the packet-processed IP frame to the PPP protocol, converts it into a PPP frame and transmits it to the CDMA modem 20 through the UART driver. The CDMA modem chip 20 then transmits the PPP frame to the CDMA network 200.

When the DBDM terminal receives the packet data, the WCDMA modem chip 30 receives the IP frame transmitted from the WCDMA network 200 and transmits it to the video chip 10. The video chip 10 transmits the received IP frame to the IP protocol, performs packet processing, operates a pertinent packet data service application and transmits the received data to the user interface 40.

In addition, the CDMA modem chip 20 transmits the PPP packet transmitted from the CDMA network 200 to the UART driver and inputs the PPP frame to the video chip 10. The video chip 10 transmits the received PPP frame to the PPP protocol, converts it into an IP frame, performs a packet processing through the IP protocol, operates a pertinent packet data service application and transmits the received data to the user interface 40.

Because the PPP is a second layer and the IP is a third layer, the IP is a protocol superior to the PPP, and CDMA/WCDMA is constructed with IP frames. Because a PPP frame has a longer frame length and additional operation is required, the video chip 10 internally processes data to be transmitted by using IP frames and transmits IP frames to the WCDMA network promptly in comparison with performing communication by using IP frames. In the case of the CDMA network, the video chip 10 converts an IP frame into a PPP frame as a subordinate layer and transmits it.

Accordingly, in embodiments of the present invention, because the video chip 10 has one data communication protocol processing both IP frames and PPP frames and the modems for the communication networks, both CDMA and the WCDMA systems can be used while maintaining consistency of communication protocol. Because the application of the packet data service can be directly connected with the socket, performance of the terminal is improved. In addition, by debugging only the protocol of the video chip, development efficiency is also improved.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A dual mode terminal supporting different packet frame modes, comprising:
    a video chip having an application of packet data services and a data communication protocol processing packets received through a first communication network and a second communication network and transmitting the packets into the application;
    a Universal Asynchronous Receiver Transmitter (UART) interface and having a protocol stack relating to the first communication network; and
    a second network modem chip coupled with the video chip through an interface and having a protocol stack relating to the second communication network,
    wherein the data communication protocol of the video chip converts the Point to Point Protocol (PPP) packets received from a first network modem chip into Internet Protocol (IP) packets for the video chip, and the data communication protocol of the video chip converts IP packets in the video chip into PPP packets for the first network modem chip,
    wherein the data communication protocol internally processes IP packets from the application and provides the packets to the second network modem chip, and the data communication protocol receives the IP packets from the second network modem chip directly.

2. The terminal of claim 1, wherein the data communication protocol performs Internet Protocol (IP) packet processing and performs mutual conversion of IP packets and Point to Point Protocol (PPP) packets only in communication with the first communication network.

3. The terminal of claim 1, wherein the video chip communicates with the first network modem chip through the Universal Asynchronous Receiver Transmitter (UART) interface and communicates with the second network modem chip through a Dual Port RAM (DPRAM) interface.

4. The terminal of claim 3, wherein the video chip and the first network modem chip each include a UART driver to communicate through the UART interface.

5. The terminal of claim 3, wherein the video chip and the second network modem chip each include an Inter Process Communication (IPC) driver to communicate through the DPRAM interface.

6. The terminal of claim 1, wherein the application of packet data services is directly interworked with a socket of a Transmission Control Protocol/Internet Protocol (TCP/IP) superior layer.

7. The terminal of claim 6, wherein the socket comprises a Transmission Control Protocol/Internet Protocol (TCP/IP) superior layer.

8. The terminal of claim 1, wherein the first network modem chip and the second network modem chip perform only functions of a modem.

9. The terminal of claim 1, wherein the data communication protocol, the first network modem chip and the first communication network are based in a Code Division Multiple Access (CDMA) network.

10. The terminal of claim 1, wherein the data communication protocol, the second network modem chip and the second communication network are based in a Wideband Code Division Multiple Access (WCDMA) network.

11. A method for supporting different packet frame modes in a terminal that supports transmission in different packet frames, wherein the terminal includes a video chip having a data communication protocol, the method comprising:
    the terminal performing packet data communication with a second communication network;
    the terminal performing packet processing by using the data communication protocol in packet data communication with a first communication network, wherein the terminal performing packet data communication with the second communication network including:
    directly providing a packet to a second network modem from the video chip when a packet is transmitted from the terminal to the second communication network in packet data communication, and
    receiving an IP frame at the video chip through the second network modem, the video chip performing packet processing and interworking with a socket when a packet is transmitted from the second communication network to the terminal,
    wherein the terminal performing packet processing by using the data communication protocol includes:
    converting an Internet Protocol (IP) packet to a Point to Point Protocol (PPP) packet in the video chip, converting the PPP packet into a PPP frame and providing the PPP frame across a Universal Asynchronous Receiver Transmitter (UART) interface to a first network modem when a packet is transmitted from the terminal and across the UART interface to the first communication network in packet data communication, and
    receiving a PPP frame at the video chip from the first network modem, converting the received PPP frame into an IP frame at the video chip, and performing packet processing and interworking with a socket when a packet is transmitted from the first communication network and across the UART interface to the terminal.

12. The method of claim 11, further comprising performing Internet Protocol (IP) packet processing with the data communication protocol only in a case of communicating with the first communication network, wherein the IP packets and the Point to Point Protocol (PPP) packets are mutually converted.

13. The method of claim 11, wherein the data communication protocol, the first network modem chip and the first communication network are based in a Code Division Multiple Access (CDMA) network.

14. The method of claim 11, wherein the data communication protocol, the second network modem chip and the second communication network are based in a Wideband Code Division Multiple Access (WCDMA) network.

15. The method of claim 11, wherein the socket comprises a Transmission Control Protocol/Internet Protocol (TCP/IP) superior layer.

16. The method of claim 11, wherein the socket comprises a Transmission Control Protocol/Internet Protocol (TCP/IP) superior layer.

17. A method for supporting different packet frame modes in a terminal that supports transmission in different packet frames, comprising:
   judging a system mode by using a terminal including a video chip having a data communication protocol for a first network and a second network;
   transmitting packet data across a Universal Asynchronous Receiver Transmitter (UART) interface and across a first network modem chip to the first network when the judged system mode is a first communication service for the first network, the transmitting including performing Internet Protocol (IP) packet processing at the video chip with the data communication protocol and performing mutual conversion of IP packet and Point to Point Protocol (PPP) packets at the video chip only when in communication with the first network;
   transmitting a pertinent Internet Protocol (IP) frame across a second network modem chip to a second network by transmitting the IP packet directly to the second network modem chip when the system mode is a second communication service for the second network;
   receiving packet data from the first network; and
   receiving data from the second network.

18. The method of claim 17, wherein transmitting packet data further includes:
   converting an Internet Protocol (IP) packet to a Point to Point Protocol (PPP) in the video chip, and converting the IP frame into a PPP frame in the video chip;
   transmitting the PPP frame across the UART interface to the first network modem chip; and
   transmitting the PPP frame to the first network.

19. The method of claim 17, wherein receiving packet data from the first network comprises:
   transmitting a Point to Point Protocol (PPP) frame received from the first network at the first network modem chip and across the UART interface to the video chip when packet data is received from the first network; and
   converting the PPP frame into an Internet Protocol (IP) frame at the video chip and performing packet processing in the video chip and operating application of a pertinent packet data service.

20. The method of claim 17, wherein the data communication protocol and the first network are based in a Code Division Multiple Access (CDMA) network.

21. The method of claim 17, wherein the data communication protocol and the first network are based in a Wideband Code Division Multiple Access (WCDMA) network.

* * * * *